(12) United States Patent
Verkama

(10) Patent No.: US 7,079,517 B2
(45) Date of Patent: Jul. 18, 2006

(54) MECHANISM FOR NETWORK-INITIATED INFORMATION TRANSFER

(75) Inventor: Markku Verkama, Espoo (FI)

(73) Assignee: Nokia Corporation, Espoo (FI)

(*) Notice: Subject to any disclaimer, the term of this patent is extended or adjusted under 35 U.S.C. 154(b) by 979 days.

(21) Appl. No.: 09/836,903

(22) Filed: Apr. 17, 2001

(65) Prior Publication Data

US 2001/0050908 A1 Dec. 13, 2001

Related U.S. Application Data

(63) Continuation of application No. PCT/FI99/00857, filed on Oct. 18, 1999.

(30) Foreign Application Priority Data

Oct. 19, 1998 (FI) ..................................... 982258

(51) Int. Cl.
 *H04Q 7/24* (2006.01)
(52) U.S. Cl. ....................... 370/338; 370/401; 370/467
(58) Field of Classification Search ................ 370/328, 370/349, 330, 254, 255; 455/435.1, 435.2
See application file for complete search history.

(56) References Cited

U.S. PATENT DOCUMENTS

| | | | |
|---|---|---|---|
| 5,629,974 A | 5/1997 | Rajala et al. | |
| 5,905,954 A | 5/1999 | Nguyen | |
| 6,018,737 A * | 1/2000 | Shah et al. | 707/10 |
| 6,104,929 A * | 8/2000 | Josse et al. | 455/445 |
| 6,128,503 A * | 10/2000 | Granberg et al. | 455/461 |
| 6,415,151 B1 * | 7/2002 | Kreppel | 455/445 |
| 2004/0076140 A1 * | 4/2004 | Begeja et al. | 370/351 |

FOREIGN PATENT DOCUMENTS

| | | |
|---|---|---|
| EP | 0 971 550 | 1/2000 |
| EP | 0 971 553 | 1/2000 |
| WO | WO 93/18606 | 9/1993 |
| WO | WO 97/27713 | 7/1997 |
| WO | WO 9727713 * | 7/1997 |
| WO | WO 97/48246 | 12/1997 |
| WO | WO 00/21310 | 4/2000 |
| WO | WO 00/22839 | 4/2000 |

* cited by examiner

*Primary Examiner*—Chau Nguyen
*Assistant Examiner*—Christopher Grey
(74) *Attorney, Agent, or Firm*—Squire, Sanders & Dempsey, LLP

(57) ABSTRACT

A method for providing a new service or information about it by a server to a mobile terminal (MS) in a packet-switched network comprising several support nodes. An identifier and PDP address are allocated to the MS. An intelligent network node is informed about the identifier and the PDP address of the MS. The PDP address stored in the intelligent network node is used for routing the new service to the mobile terminal. For example, the server can send the intelligent network node an inquiry requesting the PDP address of the MS, and the IN node can send to the server the PDP address of the MS, whereby the server is able to communicate with the MS using the PDP address indicated by the intelligent network node.

14 Claims, 1 Drawing Sheet

MECHANISM FOR NETWORK-INITIATED INFORMATION TRANSFER

This application is a continuation of international application serial No. PCT/FI199/00857, filed 18 Oct. 1999.

The invention relates to methods and equipment for providing network-initiated information transfer for terminals in a network supporting packet-switched communications. The invention is suitable for example for providing push services for mobile packet radio users. Push services are services the availability of which is informed to the client (subscriber) by the service provider or the network operator. Alternatively, the service provider or the operator can deliver the service to the client.

BACKGROUND OF THE INVENTION

For providing new services, there are generally two major architectures: client-server and push services. Client-server architecture relies on the client's (i.e. the user's) activity for receiving new services. In contrast, with push service architecture the user is at least informed of the availability of new services by the service provider or the network operator. Instead of, or in addition to, merely informing the user, the service provider or the network operator can actually download a new service or information to the user's terminal equipment.

FIG. 1 is a block diagram of a packet radio network, such as GPRS (General Packet Radio Service). The GPRS infrastructure comprises support nodes, such as a GPRS gateway support node (GGSN) and a GPRS serving support node (SGSN). The main functions of a GGSN node involve interaction with the external data network. The GGSN updates the location directory using routing information supplied by the SGSNs about the location of an MS and routes the external data network protocol packet encapsulated over the GPRS backbone to the SGSN currently serving the MS. It also decapsulates and forwards external data network packets to the appropriate data network and handles the charging of data traffic.

The main functions of the SGSN are to detect new GPRS mobile stations in its service area, handle the process of registering the new MSs along with the GPRS registers, send/receive data packets to/from the GPRS MS, and to keep a record of the location of the MSs inside of its service area. The subscription information is stored in a GPRS register (Home Location Register HLR) where the mapping between a mobile station identity (such as MSISDN or IMSI) and the PDP address is stored. The GPRS register acts as a database from which an SGSN can ask whether a new MS in its area is allowed to join the GPRS network.

The GPRS gateway support nodes GGSN connect an operator's GPRS network to external systems, such as other operators' GPRS systems, data networks 11, such as an IP network (e.g. the Internet) or an X.25 network, and service centres. Fixed hosts or servers 14 can be connected to a data network 11 for example by means of a local area network LAN and a router 15. A border gateway BG provides an access to an inter-operator GPRS backbone network 12. The GGSN may also be connected directly to a private corporate network or a server. The GGSN contains GPRS subscribers' PDP addresses and routing information, i.e. SGSN addresses. Routing information is used for tunnelling protocol data units PDU from the data network 11 to the current switching point of the MS, i.e. to the serving SGSN. The functionalities of the SGSN and the GGSN may be located in the same physical node.

The home location register HLR of the GSM network contains GPRS subscriber data and routing information and it maps the subscriber's IMSI into one or more pairs of the PDP type and PDP address. The HLR also maps each pair of a PDP type and a PDP address into a GGSN node. The SGSN has a Gr interface to the HLR (an SS7 signalling connection). The HLR of a roaming MS and its serving SGSN may be in different mobile communication networks.

The intra-operator backbone network 13, which interconnects an operator's SGSN and GGSN equipment can be implemented, for example, by means of a local area network. It should be noted that an operator's GPRS network can also be implemented without the intra-operator backbone network, for example by providing all features in one computer.

A general problem underlying the invention is that packet data users generally do not have permanent addresses, such as IP (IPv4 or IPv6) addresses. The reason is the limited address space of especially IPv4, which justifies the common practice of allocating IPv4 addresses to the user dynamically only when needed, and thus reusing the same address among different users. On the other hand, this practice makes provision of push services rather difficult.

A more specific problem can be seen in packet radio networks, such as GPRS, or in the 3rd generation systems, such as UMTS (Universal Mobile Telecommunications System). Such packet radio networks provide the user with a packet data protocol (PDP) address which can be used for routing packets to/from a mobile station in the network currently serving the user. This network may be a visited network VPLMN (Visited Public Land based Mobile Network), i.e. a network different from the user's home network HPLMN (Home PLMN). The PDP address can be an IP address or an X.25 address or equivalent. The PDP address may be static or dynamically allocated by the serving network. In the first case, the GGSN is located in the home network, whereas in the latter case the GGSN in the visited network can be used. The specific problem is that in the case of dynamic PDP address allocation, only the serving network knows the user's PDP address, such as the user's current IP address (or any other address). This is not a problem in client-server architectures, because the client (having the initiative) knows the server's address. In push service architectures, however, this is a problem because the server/service provider does not know where to "push" new services or information about them.

DISCLOSURE OF THE INVENTION

An object of the invention is to develop mechanisms for providing push services in a packet radio system. In other words, the invention should solve or at least minimize the problems associated with the prior art push service mechanisms. The object is achieved with a method and equipment which are characterized by what is disclosed in the attached independent claims. Preferred embodiments of the invention are disclosed in the attached dependent claims.

The invention is based on locating the problem and finding a solution for it. The solution is based on the vision that a packet radio network is supplemented with Intelligent Network (IN) technology. For a given area where the invention is to be implemented, the serving support nodes covering that area are operationally connected to an Intelligent Network node. The IN can be used as a data store for storing an address or an identifier by which the mobile station can be reached, Preferably, such an address or identifier is the PDP address of the MS. Within the context of the present application, the PDP address of a mobile station (MS) refers to any address, number or other identifier by which PDP packets may be routed to the MS.

While such a hybrid between a packet radio network and an intelligent network might seem desirable, implementing such a hybrid is far from obvious. IN standards have been created for wired connection-oriented telecommunications networks. Implementing IN functionality is problematic in a mobile telecommunications network wherein the mobile subscriber lacks a fixed access point. Yet mobile subscribers subscribing to IN services should be identified everywhere in the mobile telecommunications network, and knowledge about their services should be maintained, etc. This easily leads to massive data files and/or a need for extensive data transfer within the mobile telecommunications network. For instance, in the GSM (Global System for Mobile Communication) system, maintaining a connection to the Service Control Point SCP of the IN is implemented such that when a subscriber moves from the area of one Mobile services Switching Centre (MSC), acting as an IN Service Switching Point SSP, to the area of another MSC, the original MSC remains a controlling anchor centre to which information about events in the new MSC are transferred using MAP protocol. In such a case, the connection to the IN SCP may remain in the original MSC. In contrast, a packet radio system, such as the GPRS system which is used as an example, lacks any anchor node which would correspond to an anchor centre, and the control over a packet data connection is moved when the subscriber moves from the area of a support node, acting as an IN SSP, to the area of another support node. In such an arrangement, a relevant problem is maintaining the states of the Service Logic Programs (SLP) of the IN SCP corresponding to the connection as the support node changes. Maintaining the states is essential in order for the original SLP to be able to control the packet data connection in a seamless manner, even though the subscriber is moving in the areas of different support nodes.

Reference 1 discloses a solution for this specific problem. However, reference 1 had not been published on the priority day of the present application, and its main points are repeated here. 'Service connection' refers to a connection which is set up for the purpose of providing services. When the service connection is established between the IN SCP and a first SSP, an identifier is allocated to the service connection. When the subscriber moves from the area of one SSP to the area of another SSP, the identifier of the service connection is transferred from the old SSP to the new SSP, preferably with the address of the SCP and the state information of the SSP. By means of the transferred data, a service connection is established from the new SSP to the SCP, and the SLP corresponding to the service connection is identified by means of the identifier of the service connection. Even if the support node serving the subscriber changes, the corresponding SLPs maintain their state information. Thus the same SLP can control the service connection for its entire duration, although the service connection would have to be re-established because the SSP changes.

Using IN technology in a packet radio network poses another problem. The concept of IN technology is based on modelling a call with a Basic Call State Model (BCSM), but in a packet radio network there is no "call". Rather, packets are sent and received as necessary. Reference 2 discloses a solution for this specific problem, but reference 2 had not been published on the priority day of the present application, and its main points are repeated here. Several IN concepts can be used, however, if an analogy of a BCSM is created, but instead of a call, the analogy model is used to model a session in a packet radio network. At least one event in a packet radio network should be defined as a trigger event which triggers a service request into a Service Control Point (SCP) of the IN.

At first sight, implementing IN technology seems to require extensive modifications in a packet radio network, considering that for the purposes of the present invention the IN is only needed as a data store (or a front end to a data store) for storing an MS-related address or identifier. However, the invention is partly based on a vision that IN technology can be used for providing many other services besides delivering push services (such as advanced charging), and consequently, these extensive modifications can be justified.

According to a preferred embodiment of the present invention, the packet radio network is modified as follows. A suitable interface, such as an INAP (Intelligent Network Application Part) or a CAP (Camel Application Part) interface is defined between a GPRS support node (preferably an SGSN node) and an Intelligent Network node, Preferably, such an IN node is a Service Control Point SCP of the IN. The address of the SCP is indicated for example in the user's subscriber data. The GPRS support node is programmed to inform the SCP of the PDP address allocated to the user for example upon a successful PDP context activation. This message sent to the SCP may also include other information, such as information about the QoS class related to the PDP context or location information. When the user is detached from the network, or when the PDP address is cancelled or reallocated, the SCP is notified again.

The SCP is programmed to maintain an association between a subscriber identity (e.g. IMSI) and the PDP address allocated to the user. A server providing a subscriber with a new push service sends an inquiry to the SCP. The SCP responds by sending the PDP address of the user. The response can also include other data related to the PDP context, such as location information.

The invention can be used to implement push services including, but not limited to:

notification about current call tariffs, notification about new messages in the user's mailbox, notification about new messages in a voice processing system, and notification about local facilities in the user's location area.

As an example, let us consider the case where the MS subscriber subscribes to a certain service, such as a weather forecast or stock market data. The server can actually provide the subscriber with the weather forecast or stock market data. Alternatively, the server may only inform the subscriber that a new forecast or new data is available. It is also possible to download executable program code, such as Java applets or the like, to the MS.

BRIEF DESCRIPTION OF THE DRAWINGS

The invention will be described in more detail by means of preferred embodiments with reference to the appended drawing in which.

DETAILED DESCRIPTION OF THE INVENTION

Figure 1:
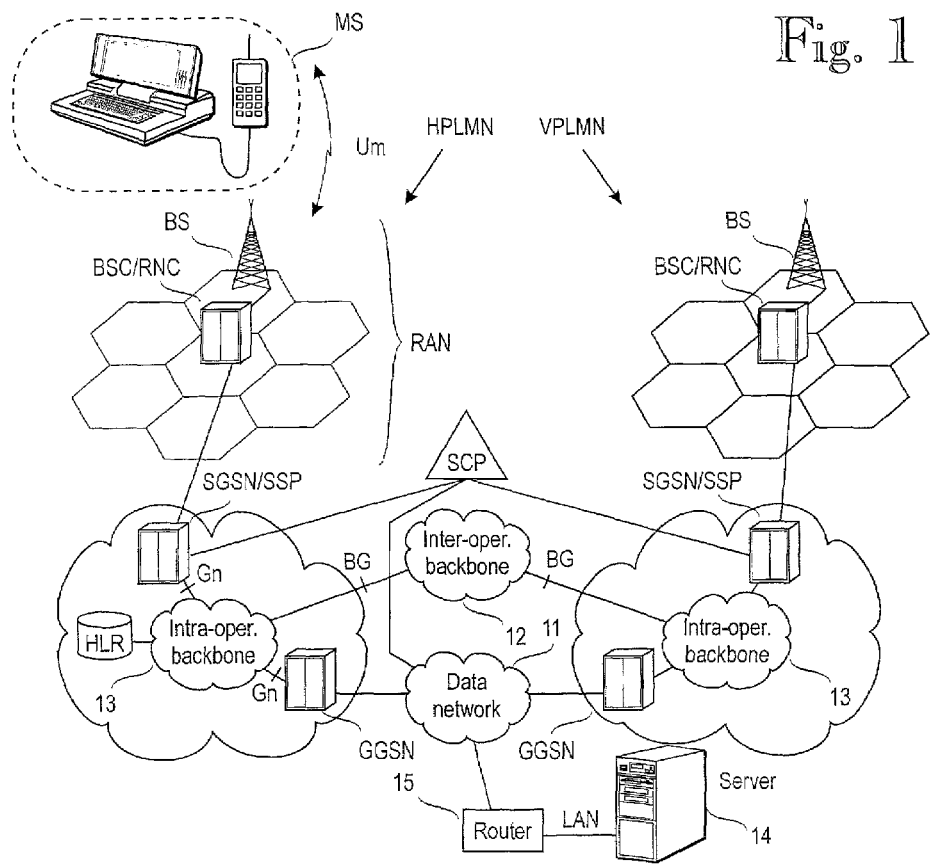
FIG. 1 is a block diagram showing some elements of a packet radio network which are essential for describing the invention.

As shown in FIG. 1, the packet radio network is supplemented with Intelligent Network (IN) technology. The packet radio network is preferably modified as follows. An INAP (Intelligent Network Application Part) interface is defined between a GPRS support node (preferably an SGSN node) and the SCP of the IN. In other words, the support node is equipped with an IN Service Switching Function SSF. A network element having SSF functionality is called a Service Switching Point (SSP). The address of the SCP can be indicated in the user's subscriber data. A state model can be formed of the PDP context activation. (In circuit-switched networks, state models are generally used for modelling a call. In a packet-switched network, the concept of a "call" does not exist, but an analogy of a state model can be used for modelling for example a session which begins when the MS attaches to the network and ends when the MS is detached from the network.) The support node with the SSP functionality, typically an SGSN/SSP node, is programmed to inform the SCP about the PDP address allocated to the user. When the user is detached from the network, or the PDP address is cancelled or reallocated, the SCP is notified again.

The SCP is modified as follows. It may comprise a proprietary interface (such as TCP/IP over Ethernet) to the server equipment for providing push services. A suitable Service Logic Program SLP is installed in the SCP. The purpose of this SLP is to create, maintain and delete an association between the identity and the PDP address of a mobile station. A server, such as the server 14, providing a subscriber of the MS with a new push service sends an inquiry to the SCP. The SCP, using the SLP, responds by sending the PDP address of the MS.

Figure 2A:
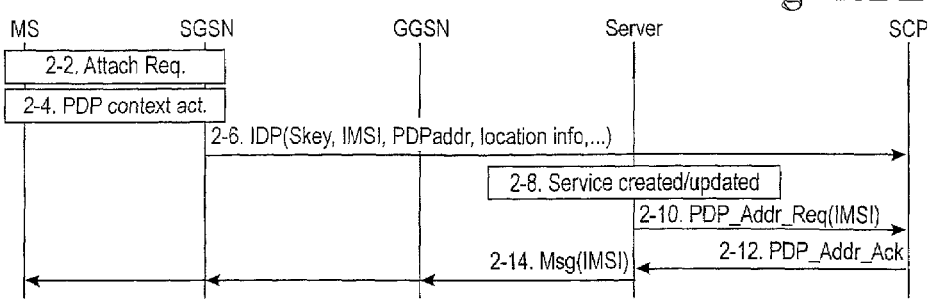
FIGS. 2A and 2B are signalling diagrams illustrating different embodiments of the invention.

FIG. 2A is a signalling diagram illustrating a preferred embodiment of the invention. In step 2-2, the MS sends an Attach Request to an SGSN node. In step 2-4, the network activates a PDP context for the MS. It should be noted that steps 2-2 and 2-4 normally comprise many different operations, such as authenticating the MS subscriber and sending an acknowledgement to the MS. However, for clarity such routine operations are not shown separately. According to a preferred embodiment of the invention, the prior art activation procedure is modified so that in step 2-6, in response to the PDP context activation, the SGSN sends the SCP a start-up message for launching an IN service. In INAP terminology, the start-up message is called an IDP (INITIAL DETECTION POINT). Its parameters comprise a service key Skey for identifying the IN service, a subscriber identity IMSI, and the PDP address of the MS. Upon receiving the IDP with these parameters, the SCP executes the Service Logic Program SLP associated with the Skey. This SLP creates and maintains an association between an MS/subscriber identity (such as the IMSI) and the corresponding PDP address.

Next, it is assumed that in step 2-8 the server 14 decides to inform the MS about a new or updated service. In step 2-10, it sends the SCP an inquiry concerning the PDP address of the MS. This inquiry is called PDP_ADDRESS_REQUEST and its parameters comprise the MS IMSI. In step 2-12, the SCP replies by sending to the server the PDP address of the MS. The reply message is called PDP_ADDRESS_ACKNOWLEDGE. Finally, in step 2-14, the server 14 knows the current PDP address of the MS and it can send a message addressed to the MS. For clarity, details of the routing of the message 2-14 are not shown separately. Such routing can be performed by normal GGSN/SGSN functionality.

As an alternative, it is not necessary to route the message 2-14 via the GGSN node. Instead, the server 14 having a Gn interface may be located in or connected to the operator's private backbone network 13 and the address information may include the GTP tunnel identifier (TI) and SGSN address of the MS, in addition to the PDP address.

Figure 2B:
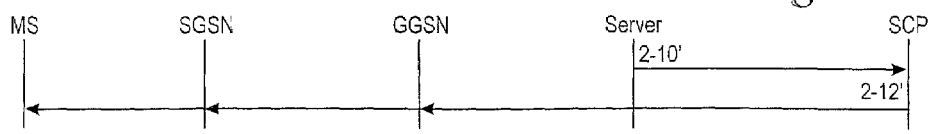

In the embodiment shown in FIG. 2A, the SCP is only used as a data store for storing the PDP address of the MS. (Alternatively, if the PDP address is stored in some external database, the SCP may be used as a front end to such a database.) An essential feature is that the server 14 does not have to keep track of the changing PDP addresses of individual mobile stations, and it is sufficient for the server to know the address of the SCP. Upon a successful PDP context activation or update, the SGSN node serving the MS informs the SCP of the PDP address allocated to the MS. Later, in step 2-10, the server sends the SCP an inquiry about the PDP address of the MS, but the actual push service or information about it is not routed via the SCP. The embodiment shown in FIG. 2A has the advantage that the server knows the PDP address of the MS and bi-directional communications can be established between the server and the MS. However, the PDP address discloses something of the MS's location and some subscribers might object to such a disclosure as trespassing on their privacy. According to an alternative embodiment shown in FIG. 2B, steps 2-10' to 2-12' are modified such that the actual push service or information about it is routed via the SCP. No messages for this purpose have been standardized, but step 2-12' is somewhat analogous to using CONNECTTORESOURCE and PLAY-ANNOUNCEMENT operations in a circuit-switched network. An advantage of this alternative embodiment is that no information about the MS location is revealed to the server which might be outside the PLMN.

The description only illustrates preferred embodiments of the invention. Based on the above description, certain modifications are apparent to a skilled reader. For instance, according to yet another embodiment, the SCP may store information about servers providing push services to the users, and in response to receiving information about the current PDP address allocated to a certain user (such as activation or deactivation of the PDP address), the SCP sends this information to the servers (e.g. by multicasting). Mobile stations with a radio interface have been used as a concrete example of mobile terminals, but the invention is equally applicable in a wired packet-switched telecommunications network. Thus, the invention is not limited to these examples or the terms used, but it may vary within the scope of the appended claims.

REFERENCES

1. Co-assigned Finnish Patent Application FI982215, titled "Menetelmä älyverkon ohjauspisteen ja kytkentäpisteen välisen yhteyden ylläpitämiseksi tietoliikennejärjestelmässä ja tietoliikennejärjestelmä", filed on 12 Oct. 1998.
2. Co-assigned Finnish Patent Application FI982128, titled "Älyverkkopalvelut pakettivälitteisessä verkossa", filed on 1 Oct. 1998.

The invention claimed is:

1. A method for transferring information, by a server to a mobile terminal in a predetermined area of a packet-switched network comprising a plurality of support nodes, the method comprising the steps of:

associating at least one identifier of the mobile terminal with a Packet Data Protocol address, or PDP address, of the same mobile terminal;

operationally connecting the server and all support nodes in said predetermined area to an intelligent network node;

informing the intelligent network node about the identifier and the current PDP address of the mobile terminal; and using the PDP address stored in the intelligent network node for routing said information to the mobile terminal.

2. A method according to claim 1, wherein the using step comprises the following steps:

before transferring said information to the mobile terminal, the server sends to the intelligent network node an inquiry requesting the PDP address of the mobile terminal; and in response to the inquiry, the intelligent network node sends to the server the PDP address of the mobile terminal;

whereby the server is able to communicate with the mobile terminal using the PDP address indicated by the intelligent network node.

3. A method according to claim 1, wherein the using step comprises the following steps:

the server sends the information to the intelligent network node; and the intelligent network node sends said information to the mobile terminal without disclosing the mobile terminal's PDP address to the server.

4. A method according to claim 1, wherein the using step comprises the following steps:

the intelligent network node stores, in addition to the PDP address, an address of at least one server; and upon receiving the current PDP address of the mobile terminal, the intelligent network node sends the current PDP address to said at least one server;

whereby the server is able to communicate with the mobile terminal without a separate inquiry.

5. A method according to claim 1, wherein the address of the intelligent network node is stored with the subscription data related to the mobile terminal.

6. A method according to claim 1, wherein the step of informing the intelligent network node is responsive to a detected establishment and/or change in the PDP address.

7. A method according to claim 1, wherein the step of informing the intelligent network node is performed by a Serving GPRS Support Node having Service Switching Point functionality.

8. A method according to claim 1, wherein said packet-switched network communicates with said mobile terminal over a radio interface.

9. A Service Control Point, wherein for transferring information by a server to a mobile terminal having at least one identifier and a PDP address, in a packet-switched network comprising a plurality of support nodes, the Service Control Point is operationally connected to the packet-switched network and the server;

adapted to store said at least one identifier and the PDP address of the mobile terminal in response to a first message originating from the packet-switched network; and adapted to support said transferring of information by a server.

10. A Service Control Point according to claim 9, wherein the Service Control Point is adapted to receive a second message from the server and to respond to the second message by sending to the server the PDP address of the mobile terminal.

11. A Service Control Point according to claim 9, wherein the Service Control Point is adapted to receive from the server a second message comprising said information, and to respond to the second message by sending said information to the mobile terminal.

12. A Service Control Point according to claim 9, wherein the Service Control Point is adapted to store, in addition to the PDP address, an address of at least one server; and upon receiving the current PDP address of the mobile terminal, to send the current PDP address to said at least one server.

13. A method according to claim 1, wherein the transferred information conveys a new service, or at least information about the new service.

14. A Service Control Point according to claim 9, wherein the transferred information conveys a new service, or at least information about the new service.

* * * * *